(12) United States Patent
Greenwood et al.

(10) Patent No.: US 7,748,510 B2
(45) Date of Patent: Jul. 6, 2010

(54) TORQUE TUBE APPARATUS FOR MOVING CARGO

(75) Inventors: James Greenwood, Saint Peters, MO (US); Philip O. Chrissos, Maryland Heights, MO (US); Dale E. Vise, Columbia, IL (US)

(73) Assignee: The Boeing Company, Chicago, IL (US)

( * ) Notice: Subject to any disclaimer, the term of this patent is extended or adjusted under 35 U.S.C. 154(b) by 515 days.

(21) Appl. No.: 11/679,627

(22) Filed: Feb. 27, 2007

(65) Prior Publication Data

US 2008/0203226 A1 Aug. 28, 2008

(51) Int. Cl.
*B65G 21/00* (2006.01)
*B65G 41/00* (2006.01)
*B65G 13/00* (2006.01)

(52) U.S. Cl. .............. 193/35 R; 193/35 SS; 198/860.1; 198/861.1; 138/109

(58) Field of Classification Search ............... 193/35 R, 193/35 SS; 198/860.1, 861.1
See application file for complete search history.

(56) References Cited

U.S. PATENT DOCUMENTS 4,235,399 A * 11/1980 Shorey .................... 244/137.1
4,239,100 A 12/1980 Corey
4,455,123 A * 6/1984 Sanders et al. .......... 416/134 A
4,462,493 A 7/1984 Nordstrom
4,799,848 A * 1/1989 Buckley .................... 414/347
4,824,050 A 4/1989 Courter
5,350,048 A 9/1994 Wylie
6,354,424 B1 3/2002 Rowles
7,086,517 B2 8/2006 Clos et al.
7,472,867 B2 1/2009 Huber et al.
2004/0251115 A1 12/2004 Spoeler
2005/0051224 A1 * 3/2005 Saha et al. .................. 138/109
2006/0090981 A1 5/2006 Clos et al.

OTHER PUBLICATIONS

Picture of Boeing 747-409F/SCD Aircraft; photographed by Wayne Cowan—Nashville Aviation Photographers; Dec. 12, 2005; http://www.airliners.net/photo/China-Airlines-Cargo/Boeing-747-409F-SCD/0987819/M/.

* cited by examiner

*Primary Examiner*—Gene Crawford
*Assistant Examiner*—Yolanda Cumbess
(74) *Attorney, Agent, or Firm*—Klintworth & Rozenblat IP LLC

(57) ABSTRACT

The invention relates to apparatuses for moving cargo. In one embodiment, such an apparatus may have a plurality of torque tubes. Each of the torque tubes may comprise a member in the shape of a continuous, closed loop defining a hole extending along the member. Rollers may be attached between torque tubes to move cargo disposed on the rollers. The apparatus may be used in the cargo hold of an aircraft.

26 Claims, 6 Drawing Sheets

TORQUE TUBE APPARATUS FOR MOVING CARGO

BACKGROUND OF THE INVENTION

Cargo handling apparatuses are used for moving palletized and/or containerized cargo into and out of the cargo compartments of commercial aircraft, in other vehicles, and/or on other structures. The structure of a cargo handling apparatus typically includes channels, which may also be designated as trays, that are generally oriented in the fore/aft direction of an aircraft. The channels usually have linear side-walls and a linear base member. A plurality of parallel roller trays, dispersed from the front to back of an aircraft, are typically used to move cargo. These roller trays are usually made of aluminum that is machined to final form.

The prior art cargo handling apparatus may be difficult to manufacture, may require an excess of parts, and/or may be costly. Moreover, they may have non-uniform cross-sections leading to in-efficient load distribution, and may be easily damaged during use due to exposed members.

A cargo handling apparatus, and method for its use, is needed to decrease one or more problems associated with one or more of the existing cargo handling apparatus.

SUMMARY OF THE INVENTION

In one aspect of the invention, an apparatus for moving cargo comprises a plurality of torque tubes. Each of the torque tubes comprises a member in the shape of a continuous, closed loop defining a hole extending along the member.

In another aspect of the invention, an apparatus for moving cargo in an aircraft comprises a plurality of composite side-wall members, and a plurality of rollers attached to the composite side-wall members.

In a further aspect of the invention, a method of moving cargo is disclosed. In one step, an apparatus is provided comprising a plurality of torque tubes and a plurality of rollers. In another step, cargo is loaded onto the rollers. In yet another step, the rollers are rotated to move the cargo from one position to a second position.

These and other features, aspects and advantages of the invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
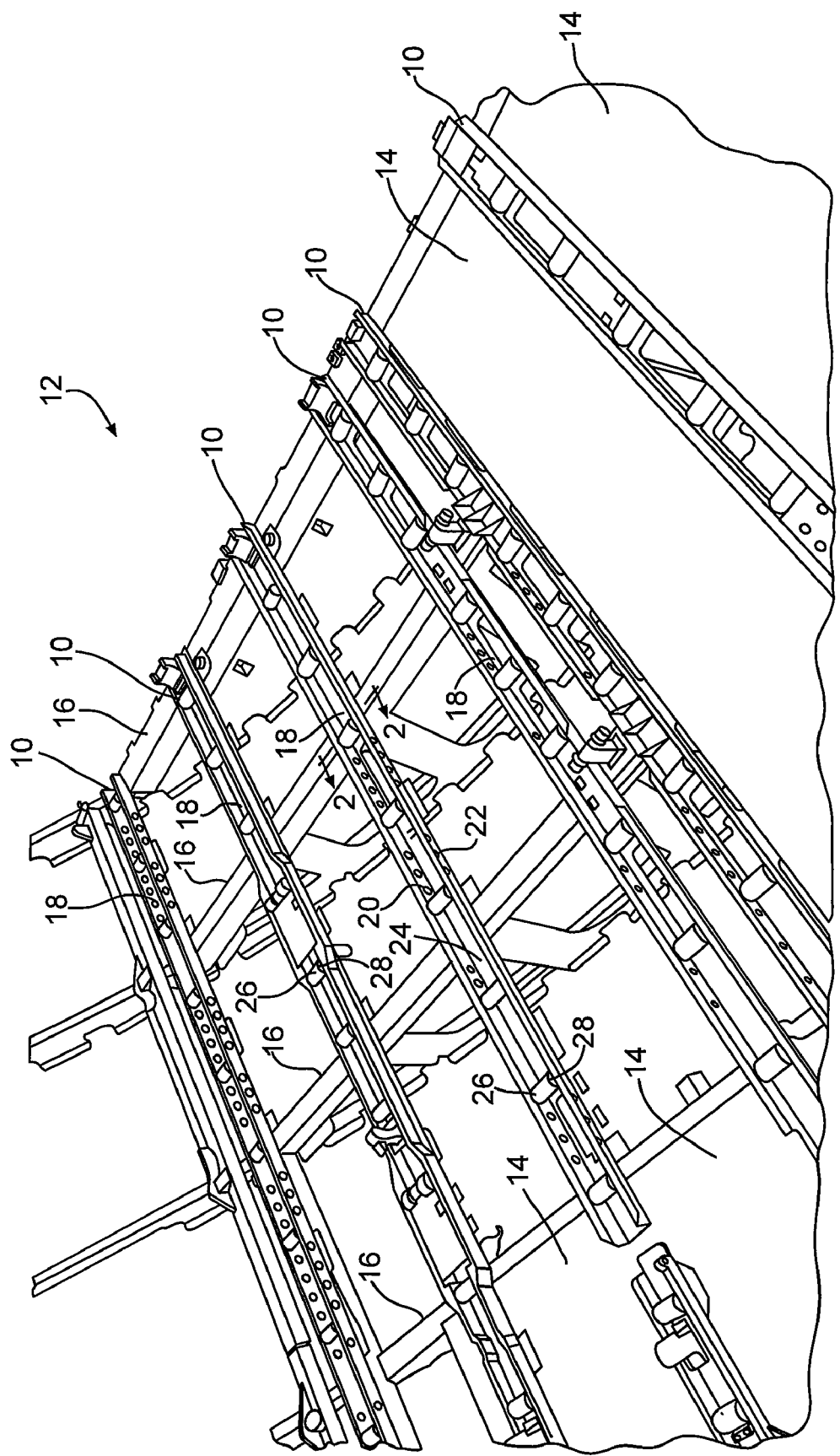
FIG. 1 depicts a partial, perspective view of a typical, prior art, aluminum, roller tray cargo apparatus in an aircraft.
Figure 2:
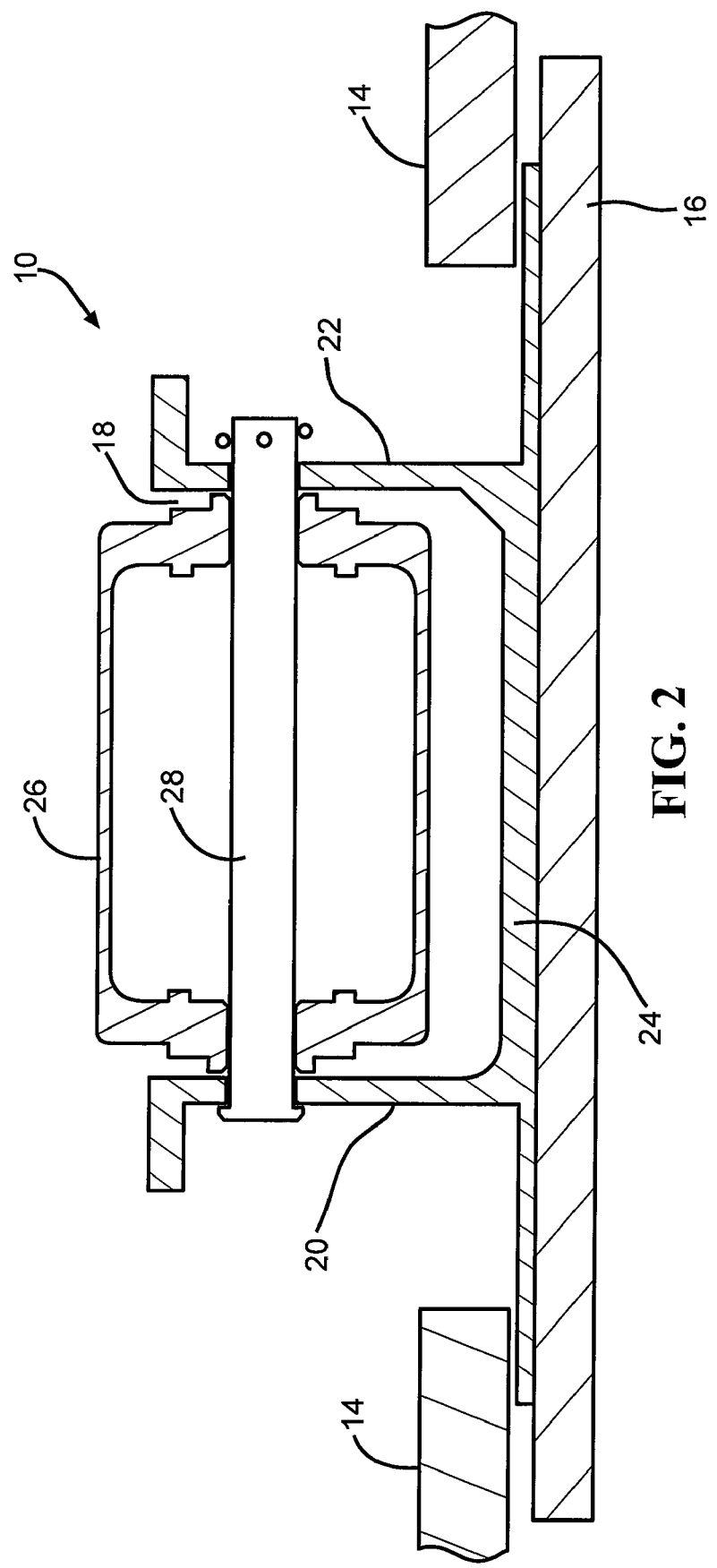
FIG. 2 shows a partial, cross-sectional view through 2-2 of FIG. 1.

FIG. 1 depicts a partial, perspective view of typical, prior art, aluminum, roller tray apparatus 10 in an aircraft 12, with part of the floor panels 14 of the aircraft 12 cut-away to reveal the floor beams 16 of the aircraft 12. FIG. 2 shows a partial cross-section view through line 2-2 of FIG. 1. As shown, a plurality of parallel, aluminum, roller tray apparatus 10 are attached perpendicularly to floor beams 16 of aircraft 12. A large aircraft may have between eight to twelve roller tray apparatus arranged parallel to one another and extending for the length of the cargo hold. Each aluminum, roller tray apparatus 10 includes a U-shaped trough 18 defined by substantially linear side-walls 20 and 22 and substantially linear base member 24. Floor panels 14 of the aircraft 12 abut against the linear side-walls 20 and 22 of each aluminum, tray apparatus 10. A plurality of rollers 26 are attached to linear side-walls 20 and 22 of each aluminum, tray apparatus 10 via shafts 28. The linear side-walls 20 and 22 and linear base member 24 of each aluminum, roller tray apparatus 10 are typically formed by machining a single piece aluminum extrusion to the desired trough-like shape 18.

These prior art, aluminum, roller tray apparatus 10 may add significant weight to the aircraft 12, may be difficult to repair, may be expensive to manufacture, may require excessive parts, may be damaged easily, may not handle loads efficiently, and/or may experience other types of problems. For instance, the prior art, aluminum, roller tray apparatus 10 may undergo shearing forces and twisting moments, or torque, due to having cargo loads cantilevered off of the apparatus 10. Their design may not allow for the efficient carrying of loads.

Figure 3:
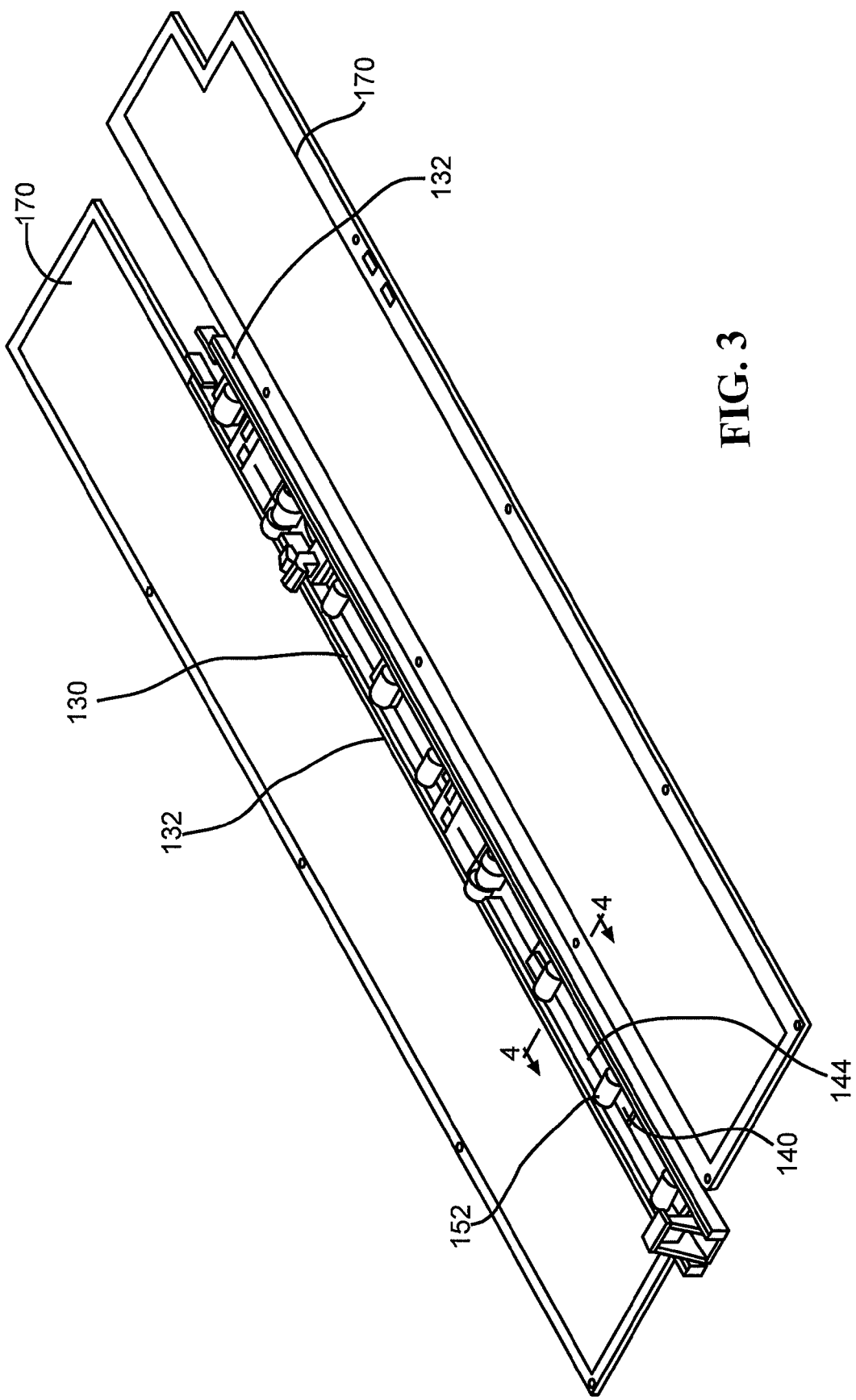
FIG. 3 depicts a partial, perspective view of one embodiment under the invention of an apparatus for moving cargo.
Figure 4:
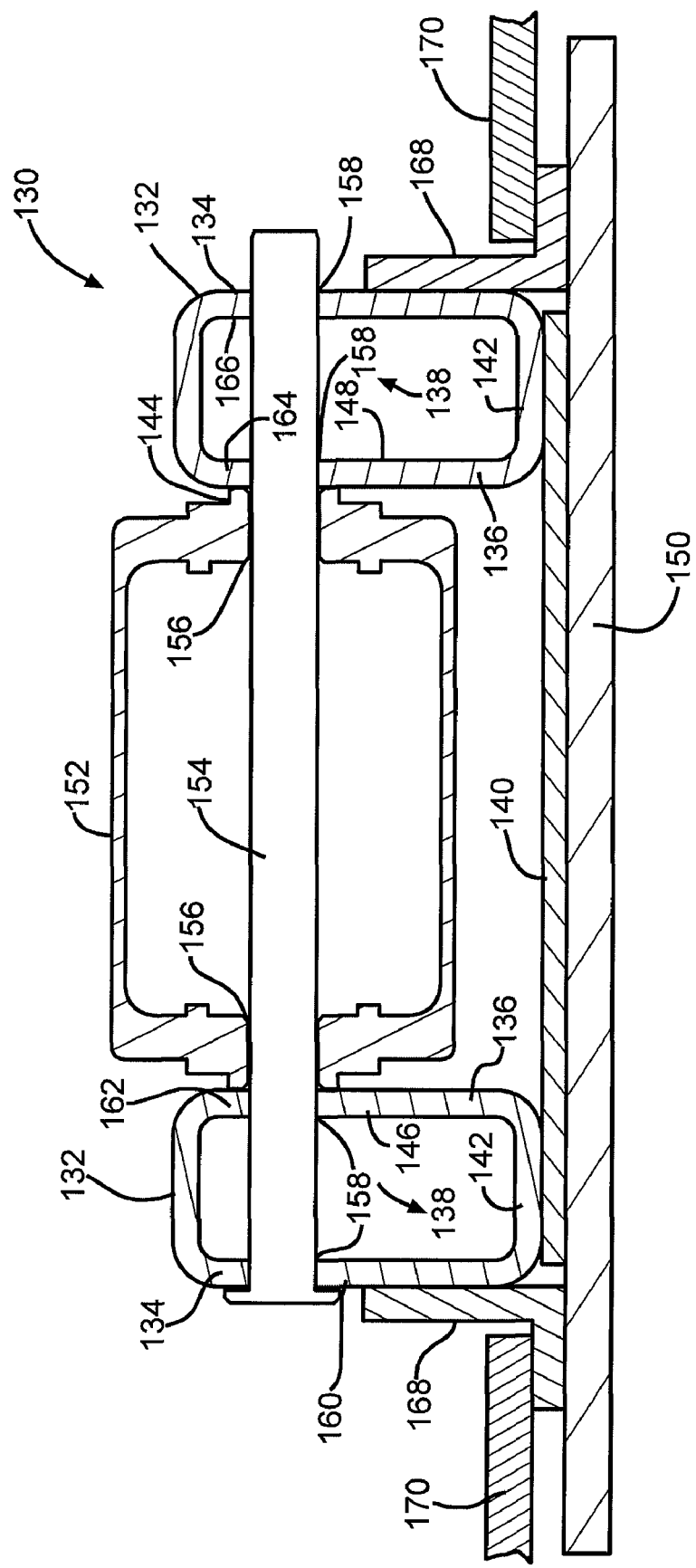
FIG. 4 shows a partial cross-section through 4-4 of FIG. 3.

FIG. 3 depicts a partial, perspective view of one embodiment under the invention of an apparatus 130 for moving cargo, while FIG. 4 depicts a partial cross-section through 4-4 of FIG. 3. As shown, the apparatus 130 may comprise two torque tubes 132. In other embodiments, any number of torque tubes 132 may be used. Each torque tube 132 may comprise a member 134 in the shape of a continuous, closed loop 136 defining a hole 138 extending along the member 134. One advantage of using closed loop torque tubes, as opposed to using open members having T-shapes, I-shapes, or hat-shapes, is that the stress due to shearing forces in the cross-sections of the torque tubes may be uniform, which may allow for less twisting, thereby resulting in the cross-sections having greater stability. As a result, a larger amount of torque may be required to cause the cross-sections of the torque tubes to deflect into shapes in which they can no longer carry additional torque.

The torque tubes 132 may be made of one or more of a composite, aluminum, titanium, steel, metal, plastic, or other material. In one embodiment, the torque tubes 132 may be made of carbon fiber composites, such as carbon-epoxy, or may be made of fiberglass, Kevlar, or other types of materials. The tubes 132 may be substantially hollow as shown, or could be wrapped around a honeycomb core, foam, or other lightweight material that may add stability to the tubes 132, and may allow further weight savings by allowing the tubes 132 to be made of a thinner material that would offset the weight of the filler material. Carbon fiber has a density of 0.056 lbs/in$^3$ which is almost half that of aluminum's density of 0.101 lbs/in$^3$. Carbon fiber may have significantly better physical properties in terms of strength and stiffness, allowing the potential to save significant amounts of weight on the cargo system of the aircraft which may have hundreds of linear feet of moving apparatus structure. Composite tubes 132 can be made using individual plies laid up around a mandrel, or with an automated process such as filament winding or tape lay up. By stacking plies of different orientations together, a composite laminate can be made which has properties tailored to the specific application. The torque tubes 132 may be in the shape of a circle, an ellipse, a rectangle, a square, or in another closed shape. The torque tubes 132 may be extruded or may comprise angles or C channels which are welded together.

In other embodiments, instead of using torque tubes 132 as disclosed herein, the apparatus 130 may instead use a plurality of side-wall members made of composites, such as carbon-fiber composites, or may be made of fiberglass, Kevlar, or other types of materials. The side-wall members may be of any shape, such as a linear shape, a curved shape, an open shape, or a looped shape. The composite, side-wall members may be substituted for the torque tubes 132 in any embodiment disclosed herein. In still other embodiments, the plurality of composite side-wall members may comprise torque tubes 132 as described above.

One or more base members 140 may be attached to bottom portions 142 of each of the torque tubes 132 to form a substantially U-shape 144. The base members 140 may be attached to the torque tubes 132 using fasteners, bolts, or through other mechanisms. In other embodiments, the base members 140 may be attached to various portions of the torque tubes 132, such as to side-portions 146 and 148 of the torque tubes 132. The base members 140 may be made of a composite, such as a carbon fiber composite, may be made of a metal such as aluminum, titanium, or steel, or may be made of other material known in the art. Moreover, the base members 140 may be substantially linear, but in other embodiments, may be in other shapes such as U-shaped. The base members 140 may be adapted to be attached to floor beams 150 of an aircraft using fasteners, bolts, or other mechanisms.

A plurality of rollers 152 may be attached to the torque tubes 132 by shafts 154 extending through holes 156 in each of the rollers 152, and through holes 158 in each of the torque tubes 132. Each roller 152 may be supported by four side-wall members 160, 162, 164, and 166 of the torque tubes 132. The rollers 152 may be adapted to move cargo disposed on the rollers 152, such as aircraft cargo. A plurality of brackets 168 may be attached to the torque tubes 132 using fasteners, bolts, or other mechanisms. The brackets 168 may be adapted to be attached floor panels 170 of an aircraft or other vehicle.

Figure 5:
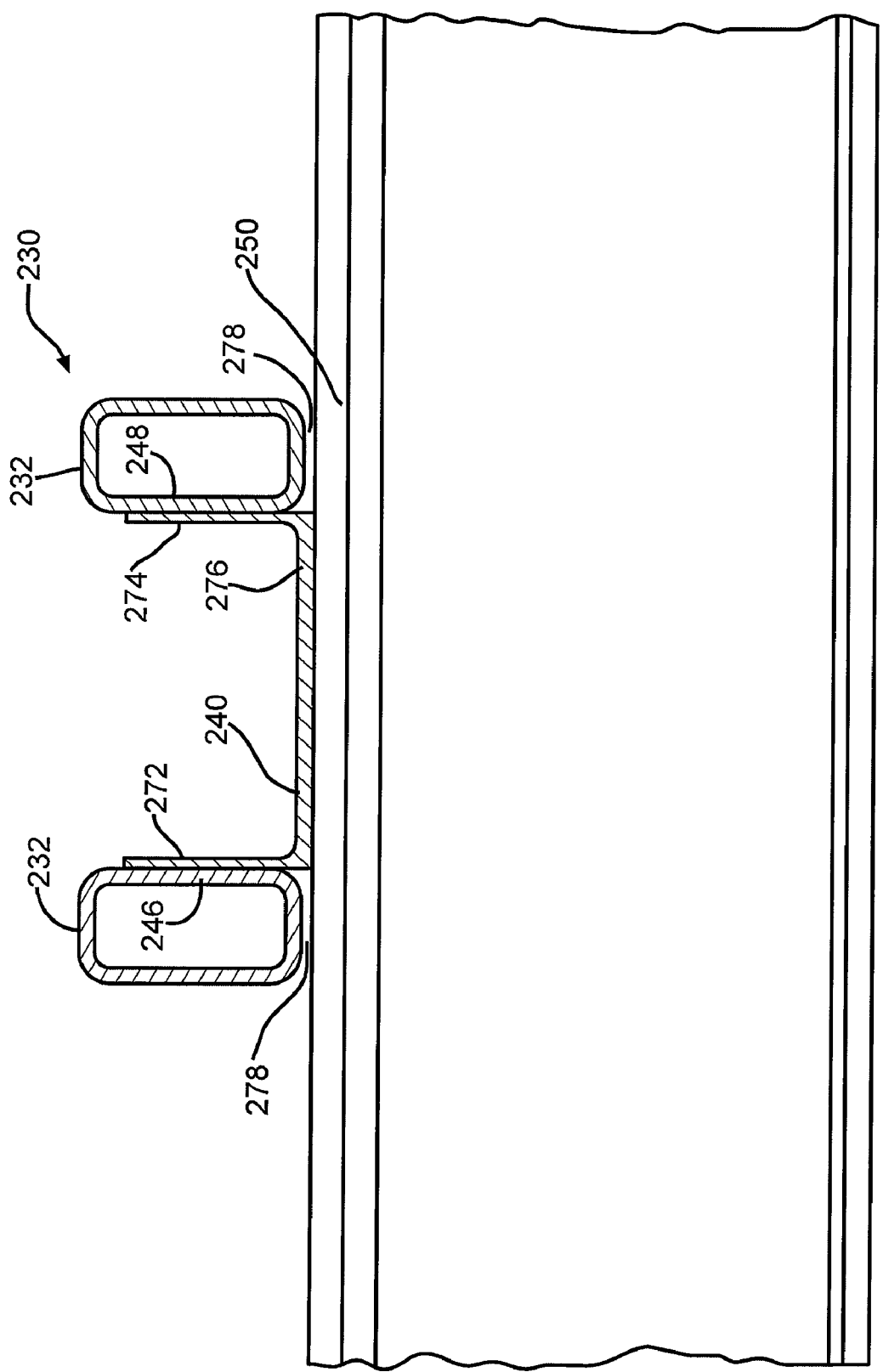
FIG. 5 depicts a partial, cross-section view of another embodiment under the invention of an apparatus for moving cargo.

FIG. 5 depicts a partial, cross-section front view of another embodiment under the invention of an apparatus 230 for moving cargo. The apparatus 230 may comprise two torque tubes 232 and a U-shaped base member 240. Side portions 246 and 248 of the torque tubes 232 may be attached to side-walls of 272 and 274 of the base member 240 using fasteners, bolts, or other mechanisms. The base member 240 may be attached to floor beams 250 of an aircraft. The torque tubes 232 may be disposed above a bottom portion 276 of the base member 240 leaving a gap 278 so that the torque tubes 232 do not contact the floor beams 250 of the aircraft.

Figure 6:
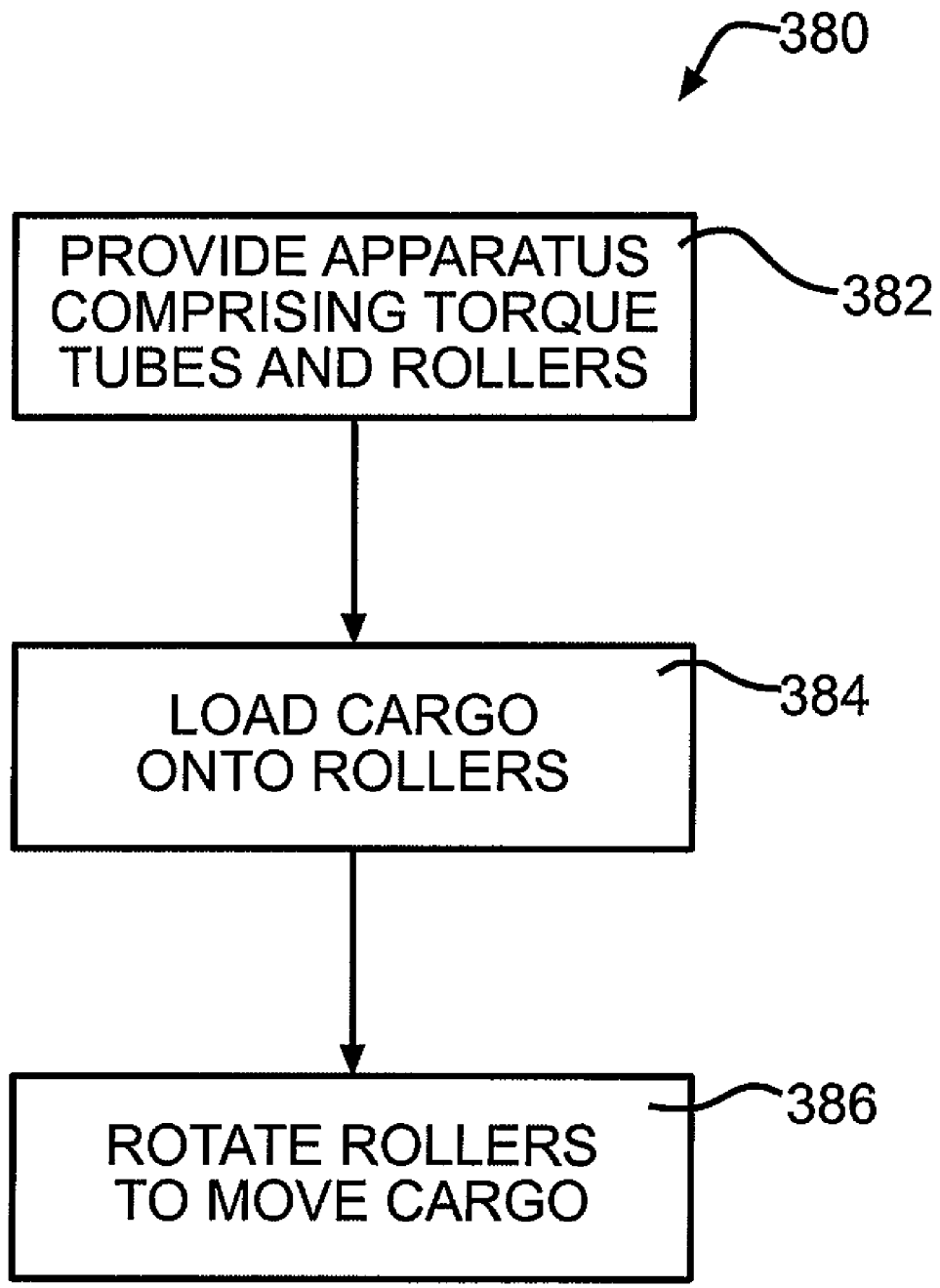
FIG. 6 is a flowchart depicting one embodiment of a method under the invention of moving cargo.

FIG. 6 is a flowchart showing a method 380 of moving cargo. In one step 382, an apparatus is provided comprising a plurality of torque tubes and a plurality of rollers. The torque tubes and rollers may comprise any of the embodiments disclosed herein, and may be installed in an aircraft. In another step 384, cargo is loaded onto the rollers. The cargo may comprise aircraft cargo. In still another step 386, the rollers are rotated to move the cargo from one position to a second position, such as between the back and front of an aircraft.

Use of torque tubes 132 having uniform cross-sections, under one embodiment of the invention, may distribute torque uniformly, may result in higher crippling allowables, higher torsional stiffness, and lateral bending stiffness, while at the same time displaying similar bending stiffness. As a result, loads may be carried more efficiently. Moreover, the use of torque tubes 132 may allow for the rollers 152 to be more sturdy since they may be supported by four wall surfaces instead of two. Additionally, use of torque tubes 132 may allow for more damage tolerance due to the lack of free edges which may be caught by cargo containers. Further, torque tubes 132 may be easily repairable, using smaller or larger tubes which may be slipped over the existing tube and attached using fasteners. Small dents in the tubes 132 may simply be drilled out and plugged with blind rivets. Torque tubes 132 may also be inexpensively and quickly manufactured, which may save parts and costs.

It should be understood, of course, that the foregoing relates to exemplary embodiments of the invention and that modifications may be made without departing from the spirit and scope of the invention as set forth in the following claims.

We claim:

1. An apparatus for moving cargo comprising:
   a plurality of torque tubes, wherein each torque tube comprises a member in the shape of a continuous, closed loop defining a hole extending along the member; and
   a plurality of rollers attached to said torque tubes, wherein at least one shaft extends through each of said rollers and through each of said torque tubes;
   wherein when the torque tubes are supported by a floor surface, the rollers are disposed apart from the floor surface to allow the rollers to rotate apart from the floor surface.

2. The apparatus of claim 1 wherein said torque tubes are made of at least one of composites, aluminum, and titanium.

3. The apparatus of claim 1 wherein said torque tubes are made of carbon composites.

4. The apparatus of claim 1 further comprising a base member, wherein each of said torque tubes is attached to said base member.

5. The apparatus of claim 4 wherein said base member is substantially linear.

6. The apparatus of claim 4 wherein said base member is U-shaped.

7. The apparatus of claim 4 wherein said base member and said torque tubes form a U-shape.

8. The apparatus of claim 5 wherein bottom portions of said torque tubes are attached to said base member.

9. The apparatus of claim 6 wherein side portions of said torque tubes are attached to side-walls of said base member.

10. The apparatus of claim 4 wherein said base member is adapted to be attached to the floor surface.

11. The apparatus of claim 10 wherein said torque tubes are disposed above a bottom portion of said base member, so that when said base member is attached to the floor surface, the torque members are adapted to not contact said floor surface.

12. The apparatus of claim 1 wherein said torque tubes are each in the shape of at least one of a circle, an ellipse, a rectangle, and a square.

13. The apparatus of claim 1 wherein said at least one shaft extends through at least four side-wall members of said torque tubes.

14. The apparatus of claim 1 having two torque tubes.

15. The apparatus of claim 1 further comprising a plurality of attached brackets which are adapted to be connected to a floor surface.

16. The apparatus of claim 1 wherein said apparatus is used to move cargo in an aircraft.

17. An apparatus for moving cargo comprising:
two torque tubes, wherein each torque tube comprises a longitudinally extending member in the shape of a continuous, closed loop defining a hole extending longitudinally along the member; and
a plurality of rollers attached to and extending laterally between each of said two torque tubes in spaced-apart relation along the longitudinally extending members.

18. The apparatus of claim 17 wherein each of said rollers is attached to and extends laterally between each of said torque tubes using at least one shaft.

19. The apparatus of claim 18 wherein a separate respective shaft attaches each separate respective roller to and laterally between each of said torque tubes.

20. The apparatus of claim 19 wherein each separate respective shaft extends through its separate respective roller and extends through each of said torque tubes.

21. The apparatus of claim 20 wherein each separate respective shaft extends through four side-wall members of said torque tubes.

22. The apparatus of claim 17 wherein the apparatus is installed in an aircraft.

23. An apparatus for moving cargo comprising:
a torque tube, wherein the torque tube comprises a member in the shape of a continuous, closed loop defining a hole extending along the member;
at least one roller; and
at least one shaft extending through said at least one roller and through two side-wall members of said torque tube;
wherein when the torque tube is supported by a floor surface, the at least one roller is disposed apart from the floor surface to allow the at least one roller to rotate apart from the floor surface.

24. The apparatus of claim 23 wherein the apparatus is installed in an aircraft.

25. The apparatus of claim 23 wherein the member extends longitudinally, the hole extends longitudinally along the longitudinally extending member; and
a plurality of the roller are attached to and extend, in spaced-apart relation, laterally along the longitudinally extending member.

26. An apparatus for moving cargo comprising:
a plurality of torque tubes, wherein each torque tube comprises a member in the shape of a continuous, closed loop defining a hole extending along the member;
a plurality of rollers attached to said torque tubes, wherein at least one shaft extends through each of said rollers and through each of said torque tubes; and
at least one of:
(1) a base member, wherein each of said torque tubes is attached to said base member, and at least one of: (a) said base member is U-shaped; (b) said base member and said torque tubes form a U-shape; and (c) said base member is adapted to be attached to a floor surface; and
(2) a plurality of attached brackets which are adapted to be connected to the floor surface.

* * * * *